United States Patent
Seidel

(10) Patent No.: US 8,095,470 B1
(45) Date of Patent: Jan. 10, 2012

(54) IDENTIFYING A CONTENT PROVIDER

(75) Inventor: Joseph J. Seidel, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 2168 days.

(21) Appl. No.: 10/457,679

(22) Filed: Jun. 9, 2003

(51) Int. Cl.
*G06F 21/00* (2006.01)
*H04N 7/167* (2006.01)

(52) U.S. Cl. ............................... 705/58; 705/59; 725/31

(58) Field of Classification Search .............. 705/56–58, 705/76, 41; 725/34, 47, 48, 49, 54, 57, 85, 725/89, 131, 100, 139, 151, 31
See application file for complete search history.

(56) References Cited

U.S. PATENT DOCUMENTS

| | | | |
|---|---|---|---|
| 6,240,185 B1 * | 5/2001 | Van Wie et al. ............... | 380/232 |
| 6,298,400 B1 * | 10/2001 | Candelore ....................... | 710/71 |
| 6,401,198 B1 * | 6/2002 | Harmer et al. .................... | 713/1 |
| 6,493,877 B1 * | 12/2002 | Yamazaki et al. ............. | 725/100 |
| 6,697,489 B1 * | 2/2004 | Candelore ...................... | 380/200 |
| 2002/0146125 A1 * | 10/2002 | Eskicioglu et al. ............. | 380/255 |
| 2003/0196204 A1 * | 10/2003 | Thiagarajan et al. ............ | 725/61 |
| 2004/0031052 A1 * | 2/2004 | Wannamaker et al. .......... | 725/61 |
| 2004/0086127 A1 * | 5/2004 | Candelore ...................... | 380/281 |
| 2004/0168184 A1 * | 8/2004 | Steenkamp et al. ............. | 725/31 |

\* cited by examiner

*Primary Examiner* — Charles C Agwumezie
(74) *Attorney, Agent, or Firm* — Lee & Hayes, PLLC

(57) ABSTRACT

An identifier routine is described which, when executed by a host device, retrieves an identifier stored in a memory card and obtains an image using the identifier. The memory card is physically coupled to the host device. The image identifies a content provider from which the host device receives broadcast content. The identifier routine is then executed by the host device to output the image.

42 Claims, 9 Drawing Sheets

IDENTIFYING A CONTENT PROVIDER

TECHNICAL FIELD

The present invention generally relates to identifying a content provider.

BACKGROUND

Consumers may access content in an ever increasingly variety of ways. By using host devices, such as set-top boxes, consumers may access content which is broadcast by cable providers, satellite providers and network providers. The range of content which is available to the consumer is also increasing, as consumers have access to traditional television programming as well as video-on-demand, pay-per-view, applications, and the like. Due to this increased range of content and variety of ways in which it may be accessed, host devices have been configured to provide increased functionality by adding additional resources to access and interact with the content. For instance, host devices may be configured with faster processors, increased memory and additional data storage devices, such as hard disk drives. By adding additional resources to the host device, however, the cost to manufacture and supply the host device to consumers has also increased.

Due to the increased cost, the host device may be configured to be operable with different content providers to provide greater functionality. To accomplish this, the host device is configured so that navigation functions and hardware to transport and convert broadcast content are included in the host device. A separate memory card is used to provide access and security functionality to the host device so that the host device may output data received from the specific content provider. Each content provider may supply a memory card to a consumer so that the consumer may receive content using the host device from the content provider that supplied the memory card. In this way, the host device is portable and may be used with different content providers, such as when the consumer moves, changes content providers, and so on. This portability, however, may be limited by the traditional way in which images that identify the content provider were supplied.

Traditionally, images in a host device that identify a content provider are hard-coded into the host device. For example, a set-top box may include a "splash" screen which displays a specific content provider's logo. The splash screen is coded as part of the middleware of the set-top box, and therefore is included as an integral part of the set-top box itself. A set-top box having such images is therefore limited to the content provider for which it is coded, and is not suitable to be used in conjunction with other content providers. If portability of the host device was desired, i.e. suitable for use with different content providers, the host device was unable to provide images specific to the content provider. Portability of the host device may include suitability of the host device to operate with a new content provider when the consumer moves to a new location, and also suitability of the host device to operate with different content providers that are available at the same location.

Therefore, there is a continuing need to provide images that identify a content provider yet retain the portability of the host device.

SUMMARY

An identifier routine is described which, when executed by a host device, retrieves an identifier stored in a memory card and obtains an image using the identifier. The image identifies a content provider from which the host device receives broadcast content. The identifier routine is then executed by the host device to output the image. A variety of images that identify the content provider may be output by the host device. For example, an image may incorporate a branding image that identifies the content provider.

BRIEF DESCRIPTION OF THE DRAWINGS

The same numbers are used throughout the disclosure and figures to reference like components and features.

DETAILED DESCRIPTION

Overview

An identifier routine is described which, when executed by a host device, retrieves an identifier stored in a memory card and obtains an image using the identifier. The image identifies a content provider from which the host device receives broadcast content. Therefore, when the image is viewed by a consumer, the consumer may identify the content provider that broadcasts content. The identifier routine is then executed by the host device to output the image. For example, the identifier routine, when executed, may be used by the host device to request an identifier from the memory card. The host device then receives the identifier from the memory card and selects an image using the identifier.

Identifying a Content Provider

Figure 1:
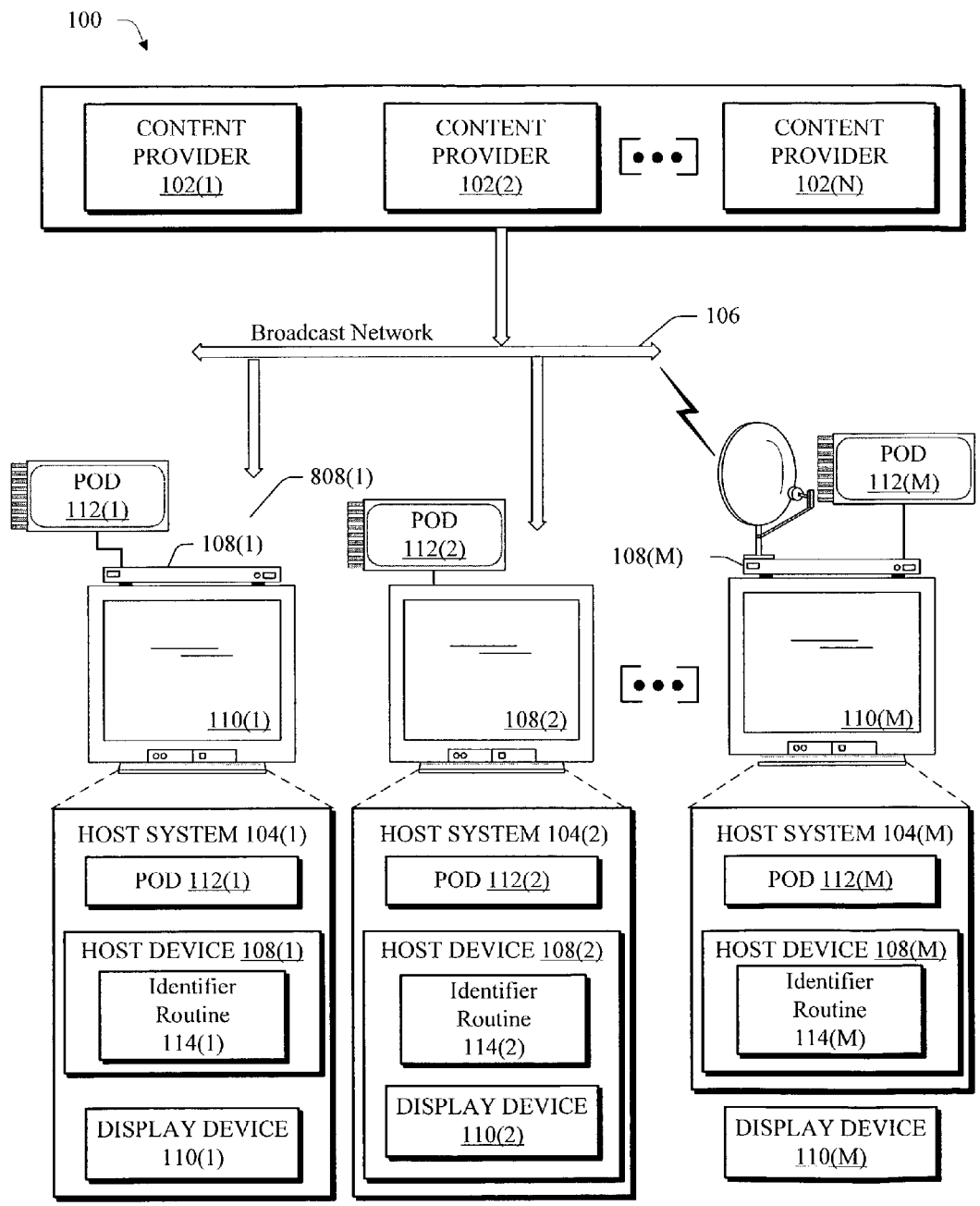
FIG. 1 illustrates an exemplary implementation of a system that includes a plurality of content providers that are communicatively coupled to a plurality of host systems over a network.

FIG. 1 is an illustration of an exemplary implementation in which a system 100 includes a plurality of content providers 102(1)-102(N) that are communicatively coupled to a plurality of host systems 104(1)-104(M) over a broadcast network 106. The content providers 102(1)-102(N) may provide a wide range of content over the broadcast network 106, such as traditional broadcast content (e.g. television programs), electronic program guides, applications, games, and so on. The broadcast network 106 that transfers the content may be any of a wide range of broadcast networks, such as a satellite network or cable network.

To receive the variety of content over the range of networks, the host systems 104(1)-104(M) may be configured in a variety of ways. For example, a host system 104(1) may be configured to include a host device 108(1) and a separate display device 110(1), such as a set-top box and television as illustrated in FIG. 1. The host device 108(1) includes hardware and software to transport content received from the content providers 102(1)-102(N) to the display device 110 (1). A host system 104(2) may also be configured to include a host device 108(2) configured as an integrated display device, e.g. an integrated television having an internal set-top box. For instance, the host device 108(2) may include hardware and software to transport content and a display device 110(2) to display the content. A host system 104(M) may also be configured without a display device 110(M), i.e. the display device 110(M) is provided separately from the host system 104(M).

In the illustrated example, memory cards are configured as point-of deployment modules 112(1)-112(M) (PODs). The memory cards are included in each of the host systems 104 (1)-104(M) to enable the host devices 108(1)-108(M) to decrypt content broadcast from the content providers 102(1)-102(N). Memory cards may assume a variety of configuration, such as an application specific integrated circuit (ASIC), a card including flash memory, the PODs 112(1)-112(M) as illustrated, and the like. The PODs 112(1)-112(M) may also assume a variety of configurations, such as a PCMCIA card and so forth. In the following discussion of FIGS. 1-3, references will be made to a POD by way of example. The following examples may also utilize a memory card as described.

The PODs 112(1)-112(M) may be supplied by the content providers 102(1)-102(N) to enable the host devices 108(1)-108(M) to decrypt content broadcast by the content providers 102(1)-102(N) over the broadcast network 106. Therefore, the host devices 108(1)-108(M) may include the hardware and software to interact with content, without being configured specifically for each of the content providers 102(1)-102 (N). The PODs 112(1)-112(M) provide functionality specific to the content provider which is used by the software and hardware of the host devices 108(1)-108(M) to decrypt the content. For instance, each of the content providers 102(1)-102(N) may utilize different proprietary encryption methods to broadcast content. By separating the information specific to the content provider in a memory card (such as the POD) from generic hardware and software, the host devices 108(1)-108(M) may be utilized in conjunction with different content providers 102(1)-102(N) when supplied with the POD from that particular content provider.

Identifier routines 114(1)-114(M) are also included to enable the host devices 108(1)-108(M) to obtain images that identify the content providers 102(1)-102(N). By executing the identifier routines 114(1)-114(M), the host devices 108 (1)-108(M) may obtain the images by accessing the PODs 112(1)-112(M). A further discussion of the identifier routine may be found in the following exemplary implementation. The configurations discussed are examples of just some of the variety of configurations that the host systems 104(1)-104 (M), host devices 108(1)-108(M) and PODs 112(1)-112(M) may assume.

Figure 2:
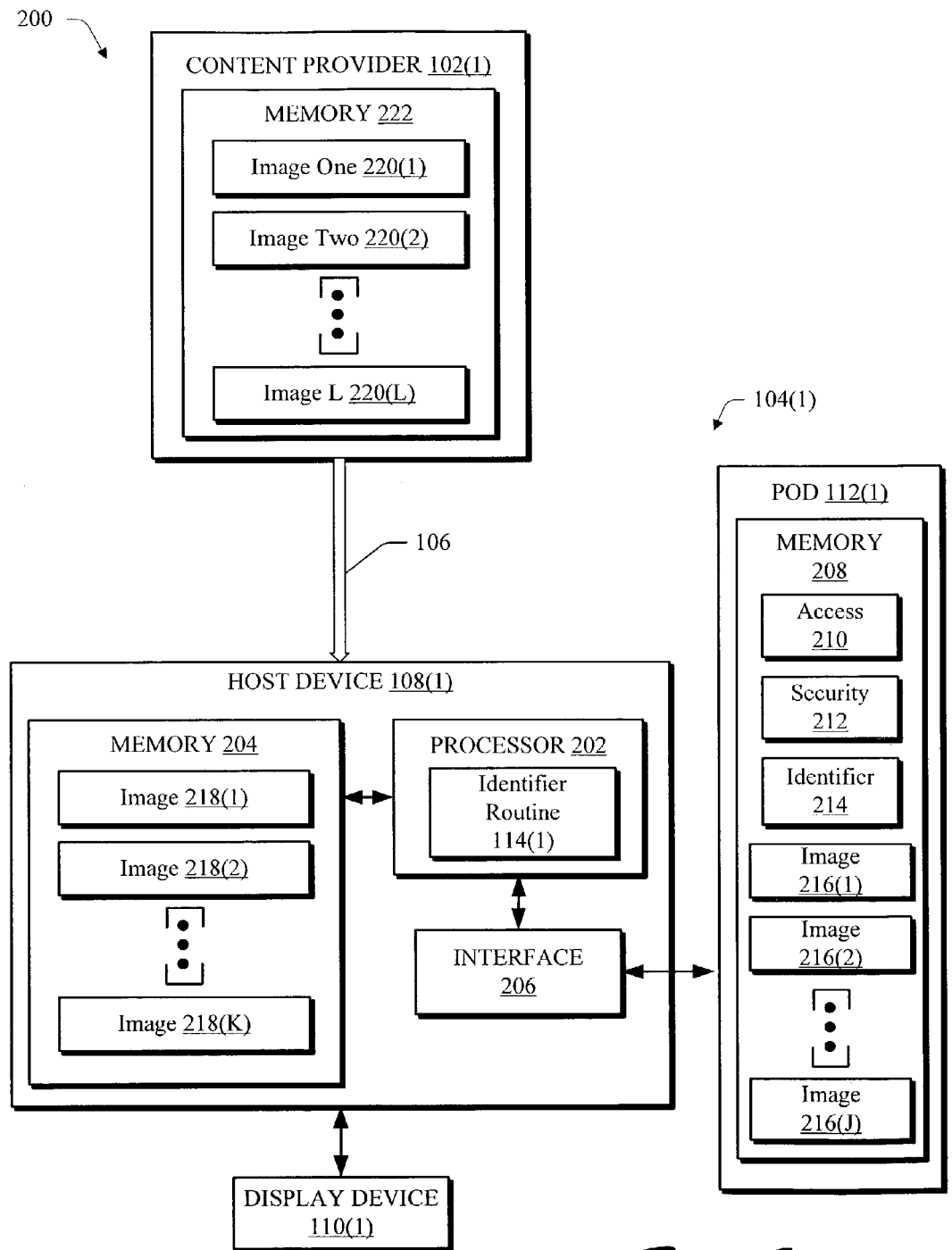
FIG. 2 illustrates an exemplary implementation of a system including the content provider and the host system of FIG. 1.

FIG. 2 is an illustration showing an exemplary implementation of a system 200 that includes the content provider 102(1) and the host system 104(1) of FIG. 1. The host system 104(1) includes the host device 108(1), the POD 112(1), and the display device 110(1). The host system 104(1) receives content that is broadcast from the content provider 102(1) over the broadcast network 106.

The host device 108(1) includes a processor 202 for executing one or more programs of instructions and a memory 204 for storing the programs and data. The host device 108(1) also includes the identifier routine 114(1) implemented as software. The identifier routine 114(1) is illustrated as being executed on the processor 202 and may be stored in the memory 204. The host device 108(1) further includes an interface 206 for communicatively coupling the processor 202 of the host device 108(1) to the POD 112(1). The interface 206 may be configured as a physical coupling that provides a local communicative coupling for the POD 112(1).

The POD 112(1) includes a memory 208 which may be used to store programs and data. The memory 208 of the POD 112(1) includes access and security 210, 212 functionality that is used by the host device 108(1) to interact with content broadcast from the content provider 102(1). For example, access 210 may include data that specifies conditional access rights for a consumer, such as which channels of a television broadcast are allowed to be viewed by a particular consumer. Therefore, the content provider 102(1) may supply the POD 112(1) to the consumer and have the conditional access rights specified in the POD 112(1). Security 212 may include data that addresses copy protection utilized by the content provider 102(1) to broadcast content. For example, security 212 may indicate timing, protocols, contain decryption keys, certificates of authenticity, and so forth, to decrypt content broadcast from the content provider 102(1) for output to the display device 110(1). Although the access and security 210, 212 functionality is illustrated as included in the memory 208, access and security functionality may be configured as a combination of hardware and/or software on the POD 112(1) that provide the functionality.

The POD 112(1) also includes an identifier 214. The identifier 214 may be used by the host device 108(1) to obtain an image that identifies a content provider from which the POD 112(1) is to be utilized to receive broadcast content. For example, the identifier 214 may include a universally unique identifier (UUID) to indicate a particular cable provider that supplied the POD 112(1) to the consumer. In another example, the identifier 214 may include a UUID provided from a range of UUIDs that are identifiable with the content provider 102(1). The identifier routine 114(1), when executed on the processor 202, may retrieve the identifier 214 from the POD 112(1). The identifier 214 may then be utilized by the host device 108(1) to obtain images that identify the content provider 102(1).

The images may be obtained from a variety of locations. For example, a plurality of images 216(1)-216(J) may be stored in the memory 208 of the POD 112(1). A plurality of images 218(1)-218(K) may also be stored in the memory 204 of the host device 108(1). Additionally, a plurality of images 220(1)-220(L) may be stored in memory 222 of the content provider 102(1). The plurality of images 220(1)-220(L) may be broadcast from the content provider 102(1) using a carousel file system from the memory 222 as will be described in relation to FIG. 8.

Figure 3:
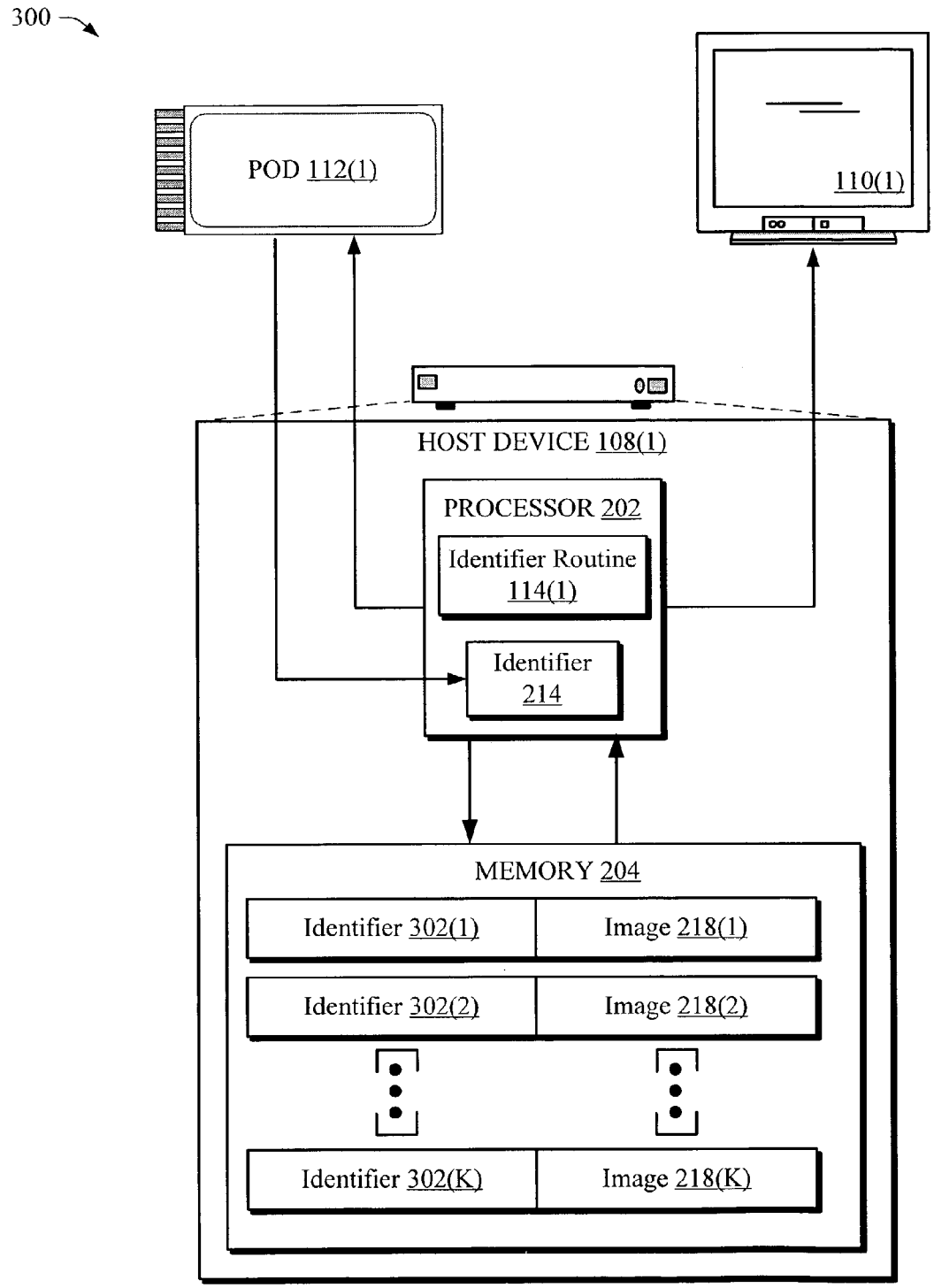
FIG. 3 is an illustration showing an exemplary implementation of the system of FIG. 2 in which an identifier routine is executed on a processor of the host device to retrieve an identifier and output an image that identifies the content provider by using the identifier.

FIG. 3 is an illustration of an exemplary implementation of a system 300 showing the identifier routine 114(1) on the processor 202 of the host device 108(1) of FIG. 2. The host device 108(1) executes the identifier routine 114(1) on the processor 202. The identifier routine 114(1) may be implemented as software, e.g. a program of instructions, which is executable on the processor 202. When executed, the identifier routine 114(1) configures the processor 202 to form a request for the identifier 214. The request is transmitted from the host device 108(1) to the POD 112(1) that is physically coupled to the host device 108(1). The POD 112(1), in response to the request, transmits the identifier 214 to the host device 108(1).

The identifier routine 114(1), when executed by the processor 202, then selects an image using the identifier 214 from a plurality of images 218(1)-218(K) stored in the memory 204. For example, the processor 202 may compare the identifier 214 to a plurality of identifiers 302(1)-302(K) that are stored as a look-up table. Each of the plurality of identifiers 302(1)-302(K) may correspond to at least one of the plurality of images 218(1)-218(K) stored in the memory 204.

The plurality of identifiers 302(1)-302(K) may be stored in the memory 204 in a variety of ways to provide desired functionality. For example, the identifier 302(1) stored in the memory 204 may correspond to a first content provider, while the identifier 302(2) may correspond to a different content provider. The identifier 302(1) has a corresponding image 218(1), and likewise the identifier 302(2) has a corresponding image 218(2). By providing these images for different content providers, the host device 108(1) may be utilized in conjunction with different content providers and yet still provide images that identify each of the different content providers.

In the illustrated example, the identifier 214 matches identity 302(1) of the plurality of identifiers 302(1)-302(K) stored in the memory 204. Therefore, the identifier routine 114(1), when executed, selects and obtains image 218(1) from the plurality of images 218(1)-218(K). Image 218(1) is then output to the display device 110(1) and displayed on the display device 110(1).

Although in the illustrated example the memory 204 was included on the host device 108(1), execution of the identifier routine 114(1) may also be utilized to obtain images from other memories. As shown in FIG. 2, images may be obtained from the memory 208 of the POD 112(1), memory 222 of the content provider 102(1), and the like. For example, the host device 108(1), after obtaining the identifier 214 from the POD 112(1), may use the identifier 214 to request that a head end system (not shown) of the content provider 102(1) transfer an image that has a corresponding identifier to the host device 108(1). In another example, the host device 108(1) may utilize the identifier 214 to obtain an image broadcast from a carousel file system. For example, the identifier 214 may be compared with identifiers of images broadcast by the content provider 102(1). If the identifier 214 matches an identifier that is broadcast, the host device 108(1) may then obtain an image corresponding to the identifier 214. For instance, when a match is detected, the host device 108(1) may obtain the next image that is broadcast from the carousel file system.

Figure 4:
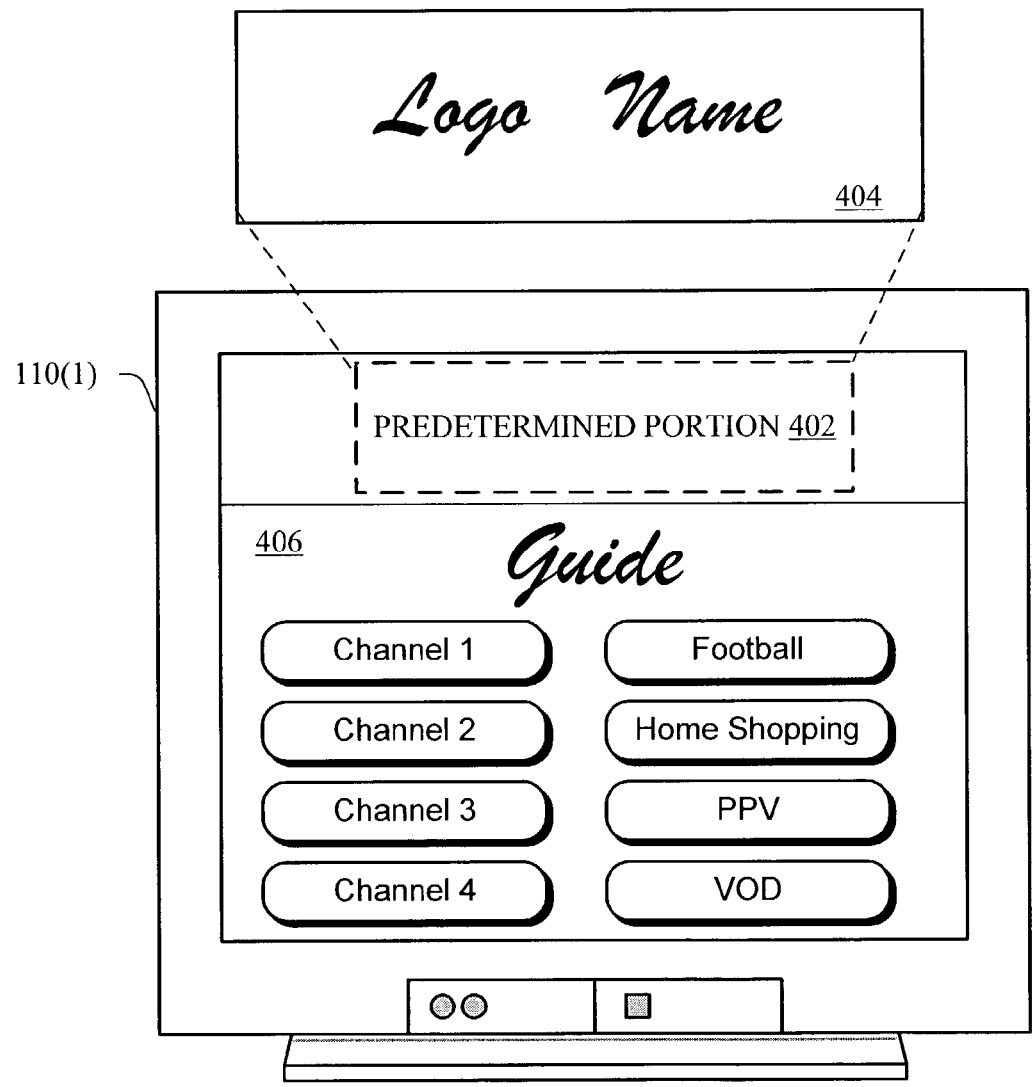
FIG. 4 is an illustration of an exemplary implementation in which a display device of FIG. 2 provides a predetermined portion for displaying an image.

FIG. 4 is an illustration of an exemplary implementation in which the display device 110(1) provides a predetermined portion 402 for displaying an image 404. The predetermined portion 402 may be thought of as a placeholder for the image 404. The image 404 may be utilized to identify a content provider to present branding. Branding may present an identifying mark, image or name to distinguish the content provider from other content providers. As illustrated, the image 404 includes the content provider's logo and name.

To provide the image 404, the predetermined portion 402 of the display device 110(1) may be utilized such that the image may be displayed with other functionality that may be of interest to a consumer. For example, the display device 110(1) may display an electronic program guide 406. The image 404 incorporating the content provider's logo and name is displayed in the predetermined portion 402. Additional images and places holders may also be provided to display images simultaneously.

Exemplary Procedures

Figure 5:
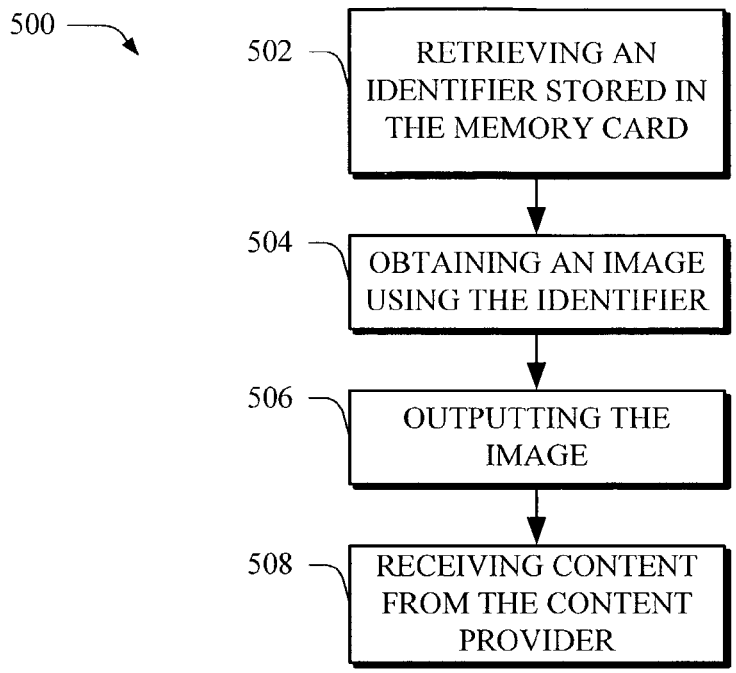
FIG. 5 is a flow chart depicting an exemplary procedure in which an identifier is retrieved from a memory card and an image is obtained using the identifier.

FIG. 5 is a flow chart illustrating an exemplary procedure 500 performed by a set-top box. At block 502, the set-top box retrieves an identifier stored in a memory card. The memory card is physically coupled to the set-top box. For example, the memory card may be physically coupled to an interface provided on the set-top box as shown in FIG. 2. In this way, the set-top box may retrieve the identifier without using a network.

At block 504, the procedure 500 obtains an image using the set-top box. The image is obtained using the identifier that was retrieved at block 502. At block 506, the set-top box outputs the image. The image may be output in a variety of ways. For instance, as shown in FIG. 1, the host device 108(1) may output the image to the separate display device 110(1). The host device 108(2) may also output the image to an included display device 110(2).

The image that is output by the set-top box in block 506 identifies the content provider 102(1). The image, for example, may be specific to the content provider 102(1) such that the image is not provided by another content provider of the plurality of content providers 102(2)-102(N). Images may incorporate a logo of the content provider, a name of the content provider, and the like. A consumer, when viewing the image, may identify the content provider that broadcasts the content to the set-top box of the consumer.

At block 508, the set-top box receives content from the content provider. For example, the set-top box may receive content broadcast from the content provider that may be decrypted and accessed using access and security functionality provided by the memory card. Thus, the set-top box may obtain an image that identifier a content provider, from which, the set-top box receives broadcast content.

Figure 6:
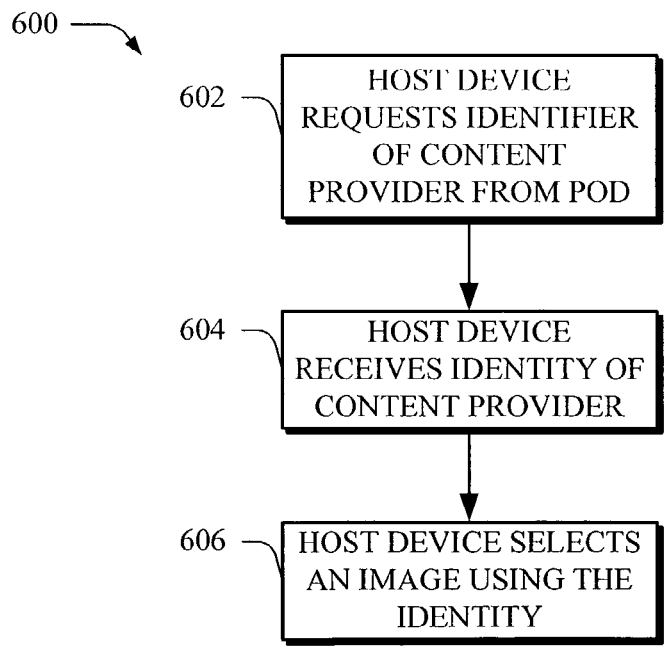
FIG. 6 is a flow chart illustrating an exemplary procedure in which an identifier is received at a host device from a point-of-deployment module and the identifier is used to select an image.

FIG. 6 is a flow chart illustrating an exemplary procedure 600 in which an identifier is received at the host device from a memory card configured as a POD. At block 602, the host device requests the identifier of the content provider from the POD. For example, the host device may form a request for the identifier of the content provider and transmit the request to the POD. In response to the request, the POD communicates the identifier to the host device. At block 604, the host device receives the identifier of the content provider from the POD.

At block 606, the host device selects an image from a plurality of images by using the identifier. For example, as shown in FIG. 3, the memory 204 includes the plurality of images 218(1)-218(K). The plurality of images 218(1)-218(K) is associated with identifiers 302(1)-302(K) of the content providers 102(1)-102(N) shown in FIG. 1. For example, at least two images of the plurality of images 218(1)-218(K) may identify respectively different content providers. In this way, images for the plurality of content providers 102(1)-102(N) shown in FIG. 1 may be supplied for use by the host device 108(1).

Figure 7:
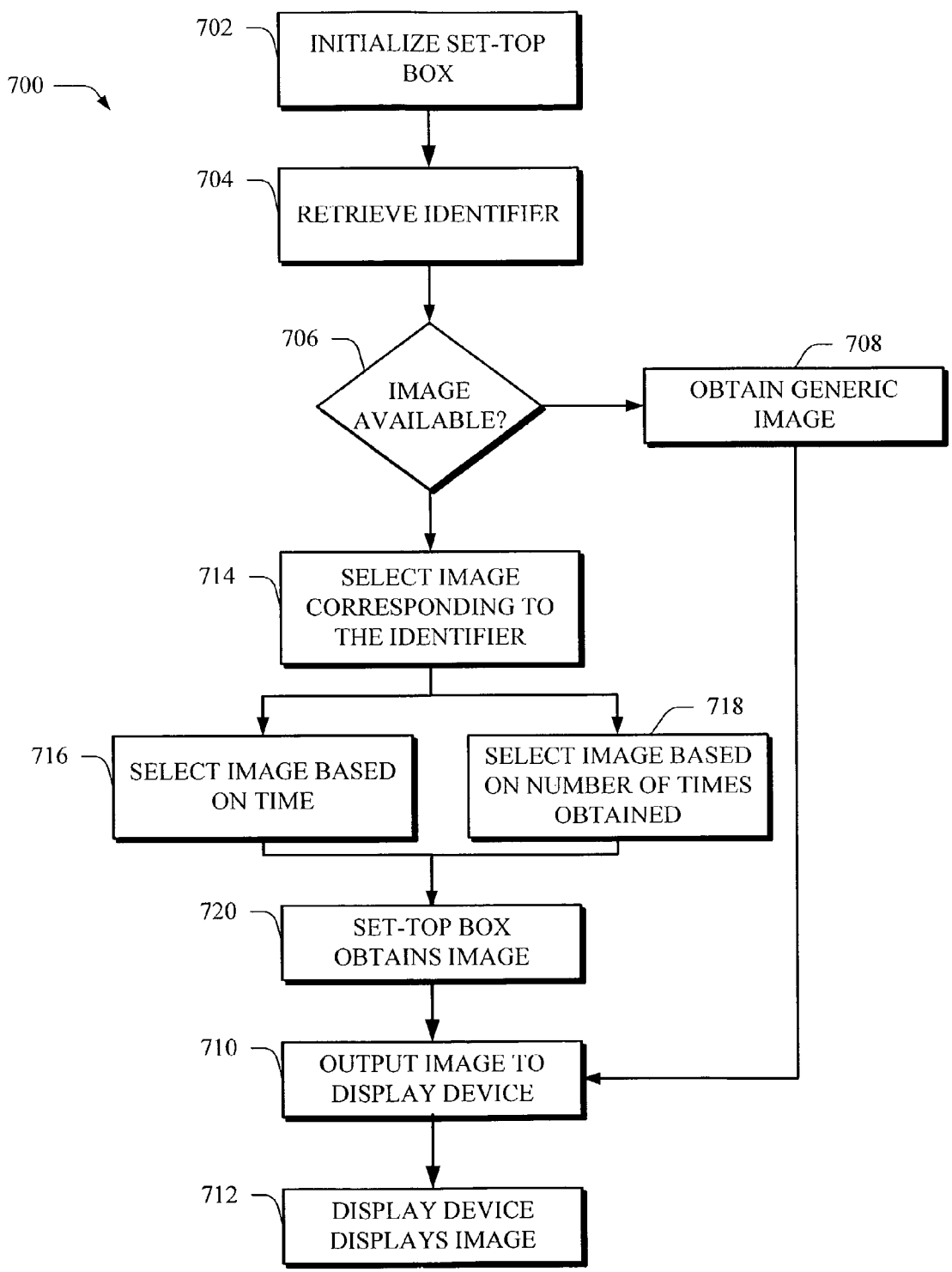
FIG. 7 is a flow chart depicting an exemplary procedure in which a set-top box receives an identifier, selects an image that identifies a content provider, and outputs the image for display on a display device.

FIG. 7 is a flow chart depicting an exemplary procedure 700 in which the set-top box receives the identifier, selects the image that identifies the content provider, and outputs the image for display on a display device. The procedure 700 begins at block 702, at which, the set-top box is initialized. For example, software may be read from ROM to a processor to implement an operating system on the processor of the host device. The identifier routine may also be read into the processor from the memory of the host device, the memory of a memory card, and/or received from the memory of the content provider over a network.

At block 704, the set-top box receives the identifier from the memory card. The identifier may be received as previously described in relation to blocks 602 and 604 of FIG. 6. At block 706, a determination is made in which the set-top box compares the identifier to identifiers that correspond to the plurality of images. The set-top box may also use the identifier to find an image broadcast in a carousel file system by the content provider. If an image is not available, the procedure 700 progresses to block 708, and the set-top box obtains a generic image. For example, the generic image may be stored in the memory of set-top box. The procedure 700 then progresses to block 710, where the image is output by the set-top box so that at block 712 the image may be displayed by the display device.

Returning to block 706, if an image is available, the procedure 700 progresses to block 714, at which, the set-top box selects the image. The image may be selected from a plurality of images that correspond to different content providers. Additionally, a plurality of images may be used to identify a particular content provider. For example, a plurality of images may be provided for a single content provider. The images may be obtained by comparing the identifier to the identifiers for the plurality of images. Each of the images for a particular content provider may include the identifier as a part of the identifier for the image to differentiate the images from each other. To provide additional functionality, an image may be selected from a plurality of images corresponding to a content provider using a variety of considerations. At block 716, for example, an image is selected based on time, such as time of day, day of the week, month of the year, and so on. For instance, a first image may be selected for a Saturday morning which is targeted towards children while a second image may be selected for a Sunday afternoon which is targeted toward a user watching football.

In another example of selecting an image, at block 718, an image is selected based on the number of times the image was previously selected. For example, a counter may be employed which indicates the number of times each image of the plurality of images was selected for output by the set-top box.

At block 720, the selected image is obtained by the set-top box. For instance, as shown in FIG. 2, the host device 108(1) may obtain the image from the memory 204 of the host device, the memory 208 of the POD 112(1), receive the image from the memory 222 of the content provider 102(1) over the broadcast network 106, and the like. At block 710, the obtained image is output by the set-top box to a display device. At block 712, the image is displayed by the display device.

Exemplary System

Figure 8:
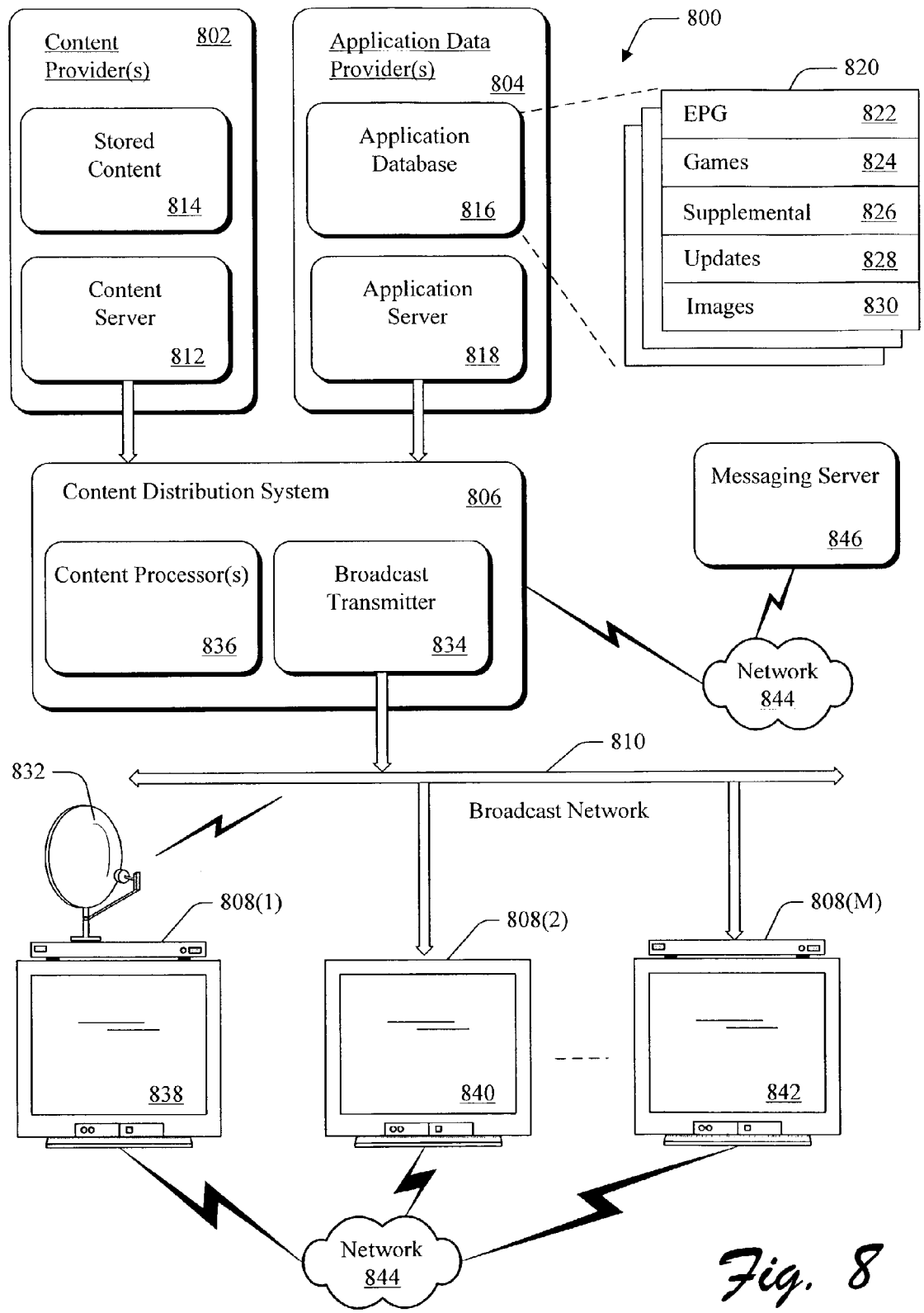
FIG. 8 illustrates an exemplary environment for the implementations described herein, and more particularly depicts a system broadcasting content to a plurality of host devices.

FIG. 8 illustrates an exemplary system 800 in which the methods, apparatus, host devices, computer programs, and systems described herein may be implemented. Exemplary system 800 is a television entertainment system that facilitates distribution of content, including television programs, applications, video-on-demand, pay-per-view, and the like, to multiple consumers. The system 800 includes one or more content providers 802, one or more application data providers 804, a content distribution system 806 which includes hardware and software to distributed content, and multiple host devices 808(1), 808(2), . . . , 808(M) coupled to the content distribution system 806 via a broadcast network 810. The content providers 802, host devices 808(1)-808(M) and broadcast network 810 can either be the same as or different from the content providers 102(1)-102(N), host devices 108(1)-108(M) and broadcast network 106 shown in FIG. 1.

Content provider 802 includes a content server 812 and stored content 814, such as interactive games, movies, television programs, commercials, music, and similar audio and/or video content. Content server 812 controls distribution of the stored content 814 from content provider 802 to the content distribution system 806. Additionally, content server 802 controls distribution of live content (e.g., content that was not previously stored, such as live feeds) and/or content stored at other locations to the content distribution system 806.

An application data provider 804 may provide applications through use of an application database 816 and an application server 818. The application database 816 can include electronic files of application data 820 which are used to generate an application for an end-user and/or supply data for an application. Exemplary applications and data may include electronic program guides 822, games 824, supplemental applications 826 for use in conjunction with broadcast content, updates 828 for software implemented by the host devices 808(1)-808(M), images 830, and the like for remote and/or interactive network use. For example, the electronic program guides 822 can be stored in electronic files of application data 820 which are used to generate an interface for remote and/or interactive network use by a TV viewer.

The application server 818 may process the applications and data prior to distribution to generate a published version of the application. The processing may involve any number of techniques to reduce, modify, or enhance the application data. For example, an application may be processed for suitability by a particular host device, such as format, display, color support, and the like. Such processes might also include selection of content, content compression, format modification, and the like. The application server 818 controls distribution of the published version of the data from application data provider 804 to the content distribution system 806 using, for example, a file transfer protocol (FTP) over a TCP/IP network (e.g., Internet, UNIX, etc.). Further, the published version of the application data may be transmitted from content distribution system 806 via satellite to a satellite dish 832 that is locally in communication with the host device 808. The applications and data need not be received via a video signal. Rather, the applications and data may be received by the host device 808 by tuning to a low bandwidth carrier signal that piggybacks with other signals and is generally transmitted at a lower data rate than video signals that are transmitted by satellite.

The content distribution system 806 includes a broadcast transmitter 834 and one or more content processors 836. Broadcast transmitter 834 broadcasts content, such as cable television content, across broadcast network 810. Broadcast network 810 may include a cable television network, RF, microwave, satellite, and/or data network, such as the Internet, and may also include wired or wireless media using any broadcast format or broadcast protocol. Additionally, broadcast network 810 may be any type of network, using any type of network topology and any network communication protocol, and may be represented or otherwise implemented as a combination of two or more networks.

Content processor 836 processes the content received from content provider 802 prior to broadcasting the content across broadcast network 810. A particular content processor 836 may encode, or otherwise process, the received content into a format that is understood by the multiple host devices 808(1), 808(2), . . . , 808(M) coupled to broadcast network 810. Additionally, propriety encryption may be employed so that content may only be decrypted by consumers have a memory card including the content provider's access and security functionality. Although FIG. 8 shows a single content provider 802, a single application data provider 804, and a single content distribution system 806, exemplary environment 800 can include any number of content providers and/or application data providers coupled to any number of content distribution systems, such as shown in the example illustrated in FIG. 1.

The content distribution system 806 is representative of a head end system that provides content to multiple subscribers. Each content distribution system 806 may receive a slightly different version of the application or content that takes into account different preferences. For example, an application server 818 creates different versions of applications that include the functionality relevant to respective head end systems, and the content distribution system 806 transmits the data to the multiple host devices 808(1), 808(2), . . . , 808(M). In one implementation, for example, content distribution system 806 utilizes a carousel file system to repeatedly broadcast executable instructions and/or images 830 over an out-of-band (OOB) channel to the host devices 808.

Host devices 808 may be implemented in a number of ways. For example, a host device 808(1) receives broadcast content from a satellite-based transmitter via satellite dish 832. Host device 808(1) is also referred to as a set-top box. Host device 808(1) is coupled to a display device which is illustrated as a television 838 for presenting the content received by the host device 808(1) (e.g., audio data and video data), as well as a graphical user interface. A particular host device 808 may be coupled to any number of televisions 840-842 and/or similar devices that can be implemented to display or otherwise render content. Similarly, any number of host devices 808 can be coupled to a single television 838.

Host device 808(1) is also coupled to receive broadcast content from broadcast network 810 and provide the received content to associated television 836. Host device 808(2) is an example of a combination television 840 and integrated set-top box (not shown). In this example, the various components and functionality of the set-top box are incorporated into the television 840, rather than using two separate devices. The set-top box incorporated into the television may receive broadcast signals via a satellite dish (similar to satellite dish 832) and/or via broadcast network 810. In alternate implementations, host devices 808 may receive broadcast signals via a two-way network 844, such as the Internet, or any other broadcast medium.

Each host device 808 may implement an identifier routine (now shown) to obtain images via broadcasting from content provider(s) 802 and/or application data provider(s) 804. For instance, the image 830 may be received from a carousel file system from the broadcast network 910. The image 830 may be identified based on an identifier received from the memory card 912 which is further discussed in FIG. 9. Alternatively, the images may be preloaded into the host device 808, received by broadcast via broadcast network 810 such as from content distribution system 806, or received from two-way network 844.

Also included in system 800 are one or more network devices, such as a messaging server 846, that communicate with content distribution system 806 and with host devices 808 (1-N) through interconnected network 844, such as the Internet. Interconnected network 844 allows two-way communication between host devices 808 (1-N) to messaging server 846. This communication allows host devices 808 (1-N) and/or messaging server 846 to transmit addressed messages over interconnected network 844. Each message may contain a message that is addressed to network resource, such as to an email address at an email server, to a Web site address of a web site on the Internet, to facsimile telephone number of a facsimile machine on a telephone network, or as is conventional with other message delivery modalities. Each addressed message can contain information of or relating to host devices 808 (1-N) in the accessing of applications that are requested by a user. By way of example, and not by way of limitation, a consumer can use the host device 808, or a personal computer or other network device to log on to network 844, such as the Internet, and to communicate with messaging server 846 or other network resource so as to locate any message that has been sent.

The messaging server 846 can be a network service, such as a Web hosting service, that stores data about any host device 808 or its respective viewer. The viewer can keep data at messaging server 846 that can in turn be accessed by other Web hosting services on the Internet where the viewer has permitted such access, which may be of a limited nature. An example of such a data provider is the Microsoft Network (MSN) of the Microsoft Corporation of Redmond, Wash. MSN provides a .NET™ PASSPORT® service that, among other services, stores data that can be retrieved by other Web services on the Internet that are compatible with the .NET™ PASSPORT® service. In this example, the viewer can submit various contact information to messaging server 846.

The process and circumstances under which messaging server 846 transmits messages to the one or more addresses can be variously configured. For instance, messaging server 846 can be configured to transmit textual messages during daylight hours to a cellular telephone number and to transmit the same to a facsimile machine during evening hours. The configuration of a Web hosting service, such as messaging server 846, can be operated by the consumer from a two-way network resource having access to interconnected network 844, such as a personal computer or a local set-top box host device. Of course, alternative configurations are contemplated as are conventional with message delivery modalities.

Exemplary Host Device

Figure 9:
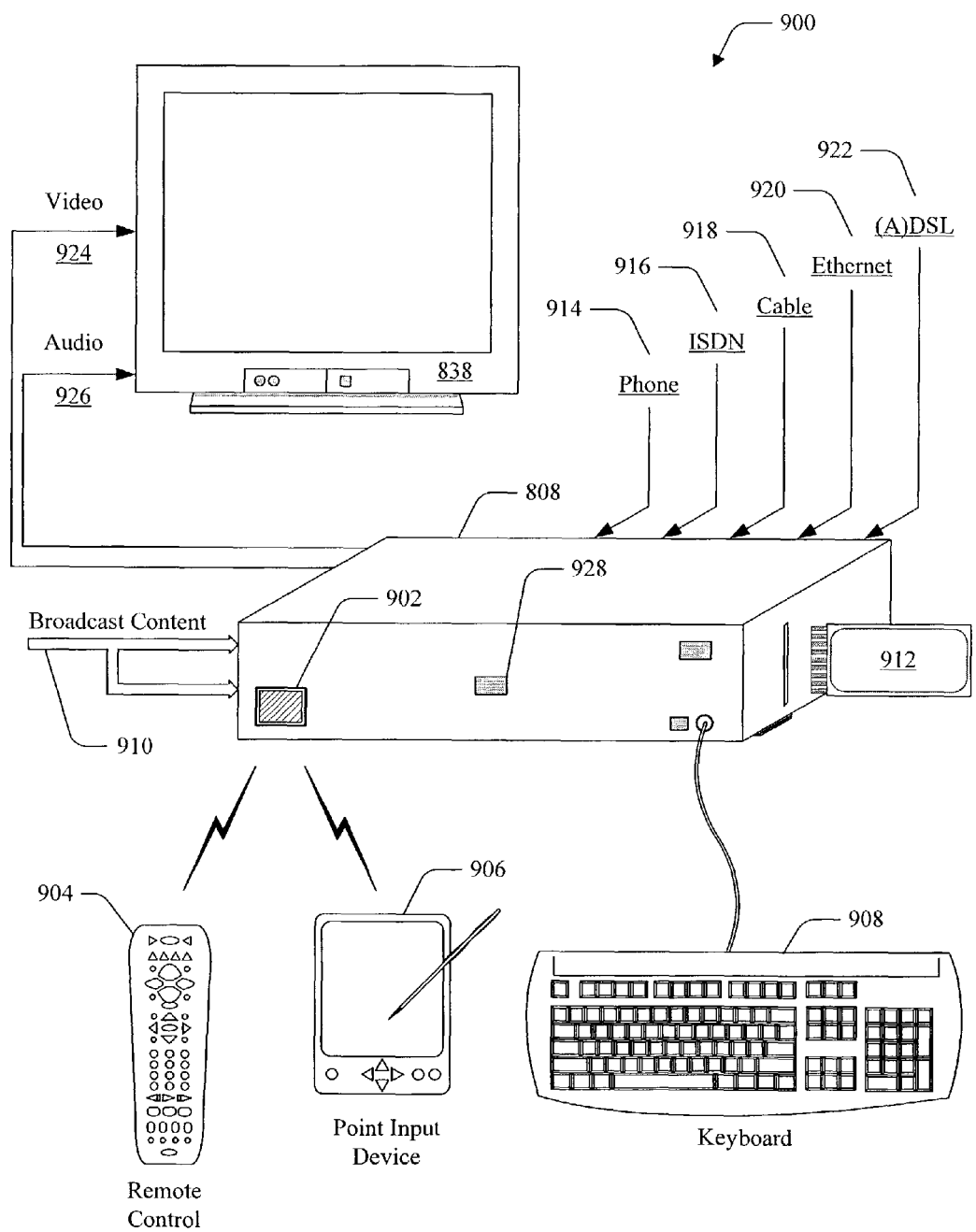
FIG. 9 illustrates an example of a host device, a memory card, a television, and various input devices that interact with the host device.

FIG. 9 illustrates an exemplary implementation 900 of a host device 808 shown as a standalone unit that connects to a television 838 of FIG. 8. Host device 808 may be implemented in any number of implementations, including as a set-top box that may be configured as a satellite receiver, an integrated television, a TV recorder with a hard disk, a game console, an information appliance, and so forth. Host device 808 may include a wireless receiving port 902, such as an infrared (IR) or Bluetooth wireless port, for receiving wireless communications from a remote control device 904, a handheld input device 906, or any other wireless device, such as a wireless keyboard. Handheld input device 906 may be a personal digital assistant (PDA), handheld computer, wireless phone, or the like. Additionally, a wired keyboard 908 is coupled to communicate with the host device 808. In alternate implementations, remote control device 904, handheld device 906, and/or keyboard 908 may use an RF communication link or other mode of transmission to communicate with host device 808.

Host device 808 receives content 910 broadcast from one or more broadcast sources, such as from a satellite or from a broadcast network. Host device 808 includes hardware and/or software for receiving and transferring broadcast signal 910. A memory card 912 is coupled to the host device 808. The memory card 912 includes hardware and/or software for decrypting content, such as propriety protocols, decryption keys, timing, and the like. The memory card 912 may be configured as a POD 112 as shown in FIG. 1.

Host device 808 also includes hardware and/or software for providing the consumer with a graphical user interface by which the consumer can, for example, access various network services, configure the host device 808, and perform other functions.

Host device 808 is capable of communicating through interconnected network 844 seen in FIG. 8 with other devices via one or more connections including a conventional telephone link 914, an ISDN link 916, a cable link 918, an Ethernet link 920, an ADSL and/or DSL link 922, and the like. Host device 808 may use any one or more of the various communication links 914-922 at a particular instant to communicate with any number of other devices and/or to establish a two-way communication with one or more network resources via network 844 seen in FIG. 8.

Host device 808 generates video signal(s) 924 and audio signal(s) 926, both of which are output to television 838. The video signals 924 and audio signals 926 can be output from host device 808 to television 838 via an RF (radio frequency) link, S-video link, composite video link, component video link, or other communication link. At reference numeral 928 in FIG. 9, host device 808 includes one or more lights to identify a current status of the host device 808 or for diagnostic reports to a consumer. Additionally, the host device 808 may include one or more control buttons, switches, or other selectable controls for controlling operation of the host device 808.

Figure 10:
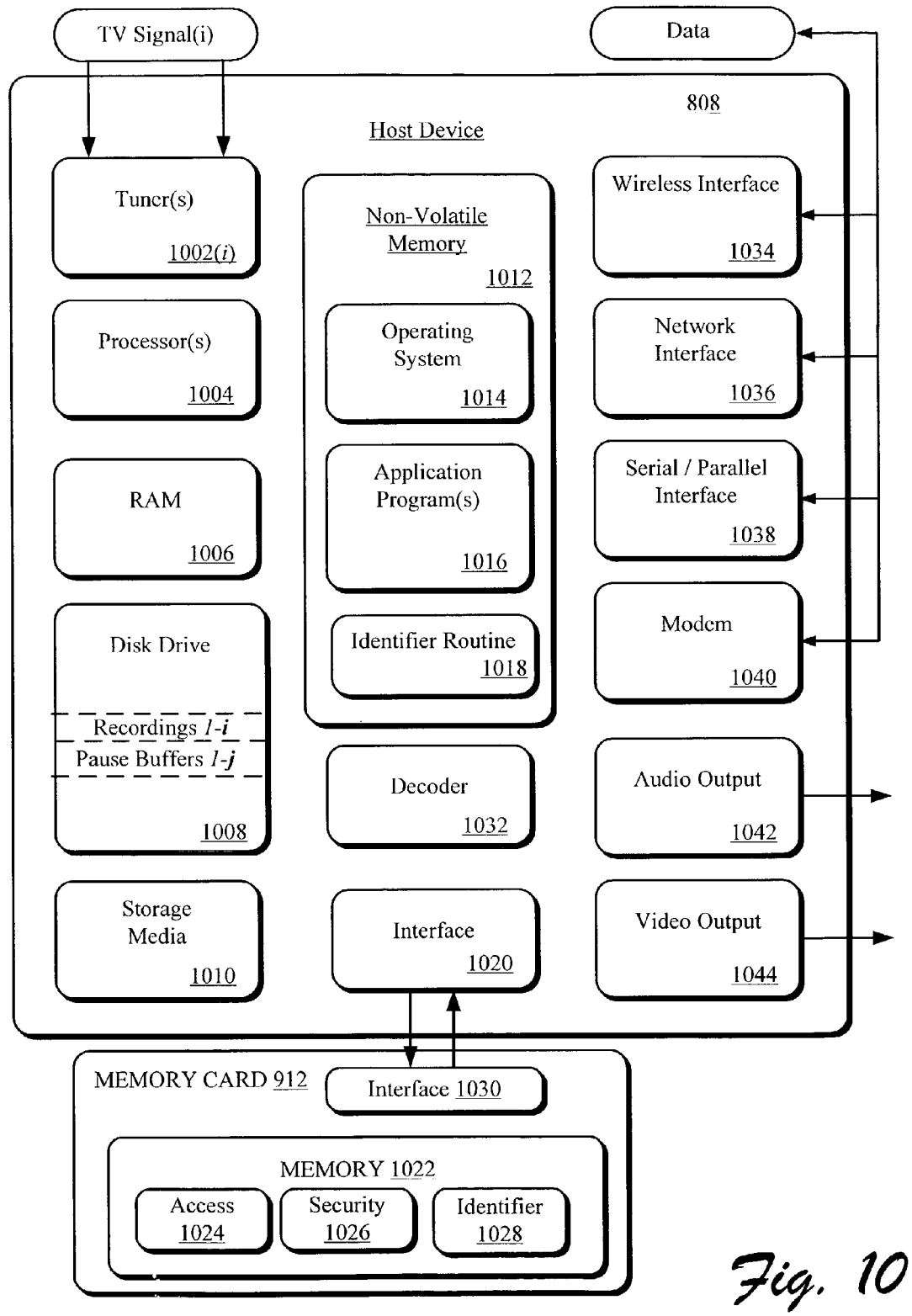
FIG. 10 is a block diagram that illustrates components of the example host device(s) and memory card shown in FIGS. 8-9.

FIG. 10 illustrates selected components of host device(s) 808 and memory card 912 shown in FIGS. 8-9. Host device 808 includes one or more tuners 1002(i). Tuners 1002(i) are representative of one or more in-band tuners that tune to various frequencies or channels to receive television signals, as well as an out-of-band tuner that tunes to the broadcast channel over which the data is broadcast to host device 808, such as application data and images 830 (FIG. 8).

Host device 808 also includes one or more processors 1004 and one or more memory components. Examples of possible memory components include a random access memory (RAM) 1006, a disk drive 1008, a mass storage component 1010 such as a tape in a tape drive or removable media component in a removable media drive, and a non-volatile memory 1012 (e.g., ROM, Flash, EPROM, EEPROM, etc.). Disk drive 1008 may have one or a plurality of recordings (i) and one or a plurality of pause buffers (j) stored thereon.

Alternative implementations of host device 808 may include a range of processing and memory capabilities, and may include more or fewer types of memory components than those illustrated in FIG. 10. For example, full-resource host devices may be implemented with substantial memory and processing resources, including a disk drive 1008 to store content for replay by the viewer. Low resource host devices, however, may have limited processing and memory capabilities, such as a limited amount of RAM 1006, no disk drive 1008, and limited processing capabilities. For instance, a RAM resource host device configured as a set-top box may have a processor 1004 in a range from about 5 MHz to about 100 MHz, and particularly in a range from about 16 MHz to about 29 MHz processor. The low resource host device may have RAM 1006 in a range from about $1/8^{th}$ MB to about 4 MB, and particularly about 2 MB.

Processor(s) 1004 process various instructions to control the operation of host device 808 and to communicate with other electronic and computing devices. The memory components (e.g., RAM 1006, disk drive 1008, storage media 1010, and non-volatile memory 1012) store various information and/or data such as content, Electronic Programming Guide (EPG) data, configuration information for host device 808, information that is specific to a content provider(s) obtained from the memory card 912, and/or graphical user interface information.

An operating system 1014 and one or more application programs 1016 may be stored in non-volatile memory 1012 and executed on processor 1004 to provide a runtime environment. A runtime environment facilitates extensibility of host device 808 by allowing various interfaces to be defined that, in turn, allow application programs 1016 to interact with host device 808. An identifier routine 1018 may be stored as software which may be included as part of the operating system 1014 and/or as a separate application as illustrated.

A variety of application programs 1016 may be implemented at host device 808 such as a browser to browse the Web, an electronic mail (email) program to facilitate email to transmit message emails to an email address, a facsimile transmission program to initiate a facsimile transmission to a facsimile machine through phone line 914 seen in FIG. 9 so as to send a facsimile message with respect to host device 808, a Short Message Service (SMS) transmission program to initiate a transmission of a text message with respect to host device 808 to a mobile pager on a page channel, and so on.

Host device 808 may also include other components pertaining to a television entertainment system which are not illustrated in this example for simplicity purposes. For instance, host device 808 can include a user interface application and user interface lights, buttons, controls, and the like to facilitate viewer interaction with the device.

Host device 808 includes an interface 1020 for physically and communicatively coupling the memory card 912 to the host device 808. The memory card 912 includes access 1024 and security 1026 functionality to receive and decrypt content broadcast from a content provider. For example, the memory card illustrated includes a memory 1022 which includes software for access 1024 and security 1026, and also includes the identifier 1028 of a content provider with which, the memory card 912 is to be utilized to receive broadcast content. Access 1024 may indicate conditional access rights to the content which the viewer has access, such as which channels may be viewed in a television broadcast. Security 1026 may include proprietary software specific to the content provider to enable the host device 808 to interact with the content. For example, security 1026 may include decryption keys, timing information, protocols, formats, and the like so that the host device 808 may output content for display by a display device. Although access 1024 and security 1026 are illustrated as stored in memory 1022, access and security functionality may be provided through hardware and/or software to specify conditional access rights and provide for decryption of broadcast content.

The memory card 912 also includes an interface 1030 for providing a physical and communicative coupling to the host device 808. For instance, the interface 1030 may be physically coupled to the interface 1020 of the host device 808 to provide a local connection.

Host device 808 also includes a decoder 1032 to decode content received from the memory card 912. Alternatively, a decoder for host device 808 can be implemented, in whole or in part, as a software application executed by processor(s) 1004. The memory card 912 may provide coded data to the host device 808 to copy protect the data which was decrypted by the memory card 912 and is then transferred to the host device 808. Wireless interface 1034 allows host device 808 to receive input commands and other information from a viewer-operated input device, such as from a remote control device or from another IR, Bluetooth, or similar RF input device.

Network interface 1036 and serial and/or parallel interface 1038 allows host device 808 to interact and communicate with other electronic and computing devices via various communication links. Although not shown, host device 808 may also include other types of data communication interfaces to communicate with other devices. Modem 1040 facilitates host device 808 communications with other electronic and computing devices via a conventional telephone line. Components seen at reference numerals 1016 and 1034-1040 facilitate applications where host device 808 has Internet access or communicates data on a two-way network.

Host device 808 also includes an audio output 1042 and a video output 1044 that outputs signals to a television or other device that processes and/or presents or otherwise renders the audio and video data. Although shown separately, some of the components of host device 808 may be implemented in an application specific integrated circuit (ASIC). A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is been made herein to one or more host devices, such as host device 808. As used herein, "host device" means any electronic device having data communications, data storage capabilities, and/or functions to process signals, such as broadcast signals (when utilized in combination with the memory card 912), received from any of a number of different sources. For example, a host device may be configured as a general purpose computing device having a memory to store a plurality of programs, a processor to execute the programs, and a port for receiving content that is broadcast by a content provider. The plurality of programs may include an operating system and other traditional programs, such as word processors and spread sheets. The content provider, as intended herein, can be a local television broadcaster, a cable television broadcaster, satellite television broadcaster, a VOD service provider, a Web page, an Internet instant message, an Internet transmission, a non-removable storage medium, a removable storage medium, a digital video recorder, a smart card or a portable multimedia device. Additionally, the identifier routine 1018 can be obtained by the host device 808 at the communication port from the content provider via one or more data communication media. The data communication media can be in-band data of a broadcast, out-of-band data, a web page, an e-mail message, an instant message, an Internet transmission, a string of plain text, a smart card, a removable storage medium, or a non-removable storage medium. For example, the identifier routine 1018 may be stored in the memory 1022 of the memory card 912 to be executed by the processor 1004 of the host device 808.

Computer Readable Media

An implementation of exemplary subject matter may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method performed by a set-top box that is physically coupled to a memory card, the method comprising:
   retrieving an identifier stored in the memory card;
   using the identifier to an image from a plurality of images at least two of which identify respectively different content providers;
   outputting the image, wherein the image identifies a particular content provider; and
   receiving content from the particular content provider.

2. A method as described in claim 1, wherein the memory card is selected from the group consisting of a PCMCIA card and a point-of-deployment module (POD).

3. A method as described in claim 1, wherein the retrieving further comprises:
   forming a request for the identifier;
   transmitting the request from the set-top box to the memory card; and
   receiving the identifier at the set-top box from the memory card.

4. A method as described in claim 1, further comprising selecting the image from the plurality of images, wherein the set-top box uses the identifier to select the image.

5. A method as described in claim 1, further comprising selecting the image from the plurality of images by using the identifier based on a consideration selected from the group consisting of:
   the time of day at which the selection of the image is made; and
   number of times the selected image was previously selected.

6. A method as described in claim 1, wherein the image is obtained from a location selected from the group consisting of:
the set-top box;
the memory card; and
a head end system of the particular content provider.

7. A method as described in claim 1, wherein the memory card is configured to include access and security functionality to decrypt content broadcast from the particular content provider such that the decrypted content is suitable for display by a display device.

8. A method as described in claim 1, wherein the image incorporates a selection from the group consisting of:
a branding;
a logo; and
a name.

9. One or more computer-readable media comprising computer-executable instructions that, when executed in the set-top box, perform the method as recited in claim 1.

10. A method comprising:
requesting an identifier of a content provider from a point-of-deployment module (POD) that is communicatively coupled to a host device;
receiving the identifier from the POD at the host device;
selecting an image from a plurality of images at least two of which identify respectively different content providers, wherein the host device uses the identifier to select the image; and
receiving content from the content provider that corresponds to the identifier.

11. A method as described in claim 10, further comprising outputting the selected image.

12. A method as described in claim 10, wherein the selecting further comprises choosing the image based on a consideration selected from the group consisting of:
time; and
number of times each of the plurality of images was previously selected.

13. A method as described in claim 10, wherein the image incorporates a selection from the group consisting of:
a branding;
a logo; and
a name.

14. A method as described in claim 10, further comprising obtaining the selected image from a location selected from the group consisting of:
the host device;
the POD; and
a head end system.

15. A method as described in claim 10, wherein the POD is configured to include access and security functionality to decrypt content broadcast from the content provider such that the decrypted content is suitable for display by a display device.

16. A method as described in claim 10, wherein the host device is configured as a set-top box.

17. One or more computer-readable media comprising computer-executable instructions that, when executed in the host device, perform the method as recited in claim 10.

18. A method comprising:
receiving content from a content provider at a host device or at a point-of-deployment module (POD);
retrieving an identifier at the host device from the POD, wherein the POD is physically coupled to the host device; and
determining, at the host device, if an image that identifies the content provider is available by using the identifier, wherein:
if the image is available, obtaining the image at the host device; and
if the image is not available, obtaining a generic image at the host device.

19. A method as described in claim 18, further comprising outputting the image or the generic image from the host device.

20. A method as described in claim 18, wherein the image that identifies the content provider incorporates a selection from the group consisting of:
a branding;
a logo; and
a name.

21. One or more computer-readable media comprising computer-executable instructions that, when executed by the host device, perform the method as recited in claim 18.

22. A method comprising:
receiving an identifier at a set-top box from a point-of-deployment module (POD), wherein the POD is physically coupled to the set-top box;
selecting an image from a plurality of images at least two of which identify respectively different content providers, wherein:
the set-top box uses the identifier to select the image; and
the plurality of images are broadcast in a carousel file system to the set-top box;
obtaining the selected image at the set-top box from the broadcast of the carousel file system; and
outputting, with the set-top box, the obtained image for display at a display device.

23. A method as described in claim 22, further comprising receiving, at the set-top box, content from one said content provider of the different content providers, wherein the identifier corresponds to the content provider from which the content is received at the set-top box.

24. One or more computer-readable media comprising computer-executable instructions that, when executed by the set-top box, perform the method as recited in claim 22.

25. A set-top box, comprising:
an interface for physically receiving a memory card, the memory card including access and security functionality for decrypting content broadcast by a content provider;
a memory;
a processor which is communicatively coupled to the interface and the memory; an identifier routine stored in the memory and executed on the processor to:
receive a communication from the interface, the communication including an identifier from the memory card;
select an image that identifies the content provider from a plurality of images using the identifier, wherein the image is selected based on at least one consideration selected from the group consisting of:
the time of day at which the image is selected; and
number of times that the selected image was previously selected;
and
obtain the selected image; and
a tuner for receiving content that is broadcast from the content provider.

26. A set-top box as described in claim 25, further comprising outputting the obtained image.

27. A set-top box as described in claim 25, wherein the image is obtained from a location selected from the group consisting of:
  the memory;
  the interface; and
  a port at which the tuner receives the content that is broadcast from the content provider.

28. A set-top box as described in claim 25, wherein the image incorporates a selection from the group consisting of:
  a branding;
  a logo; and
  a name.

29. A set-top box as described in claim 25, wherein at least two of the plurality of images identify respectively different content providers.

30. A general purpose computing device, comprising:
  a memory that maintains a plurality of programs;
  an interface for providing a physical coupling to a point-of-deployment module (POD);
  a port for receiving content that is broadcast by a content provider;
  a processor that is communicatively coupled to the interface, the memory, and the port; and
  an identifier routine being implemented as software that is stored in the memory and executed on the processor to:
    receive a first identifier of the content provider from the interface;
    compare the first identifier to a second identifier referencing an image; and
    output the image corresponding to the second identifier if the first identifier corresponds to the second identifier, wherein the image identifies the content provider.

31. A general purpose computing device as described in claim 30, wherein the identifier routine is executed on the processor to send a request for the identifier to the interface.

32. A point-of-deployment module (POD) comprising:
  an interface for providing a physical coupling to a host device;
  access functionality that specifies conditional access rights for receiving content broadcast by a content provider to the host device;
  security functionality that provides for decryption of the content broadcast by the content provider to the host device; and
  a memory that is communicatively coupled to the interface, the memory including:
    a first identifier for:
      communicating from the POD over the interface to the host device; and
      use by the host device to obtain and output an image that identifies the content provider when the first identifier matches a second identifier corresponding to the image.

33. A point-of-deployment module as described in claim 32, wherein the identifier is communicated to the interface for receipt by the host device in response to a request received at the interface from the host device.

34. A point-of-deployment module as described in claim 32, wherein the image that identifies the content provider is stored in the memory.

35. A point-of-deployment module as described in claim 32, wherein the image incorporates a selection from the group consisting of:
  a branding;
  a logo; and
  a name.

36. A head end system comprising:
  a memory including an image that identifies a content provider and a first identifier referencing the image; and
  a broadcast transmitter for broadcasting to a host device that is physically coupled to a point-of-deployment module (POD), the broadcasting including:
    the image and the first identifier from the memory; and
    content from the content provider;
  whereby:
    the first identifier is for use by the host device to compare the first identifier with a second identifier received at the host device from the POD; and
    if the first and second identifiers match, the host device obtains and outputs the image that is broadcast to the host device.

37. A head end system as described in claim 36, wherein the host device is configured as a set-top box.

38. A system, comprising:
  a head end system for broadcasting content of a content provider; and
  a host system for receiving the broadcast of the content from the head end system over a broadcast network, the host system including:
    a memory card including a first identifier, wherein the memory card is configured to provide access and security functionality to a host device, wherein:
      the security functionality provides for decryption of the content that is received in the broadcast from the head-end system; and
      the access functionality specifies conditional access rights to the content that is received in the broadcast by the head end system; and
    the host device is physically coupled to the memory card, wherein the host device includes an identifier routine that is stored in a memory and executed on a processor of the host device to:
      receive the first identifier from the memory card;
      compare the first identifier to a second identifier referencing an image; and
      output the image if the first identifier corresponds to the second identifier, wherein the image identifies the content provider that provides the content that is received by the host system from the head end system.

39. A system as described in claim 38, wherein the memory card is configured as a point-of-deployment module.

40. A system as described in claim 38, wherein the host device is configured as a set-top box.

41. An identifier routine being implemented as software stored in a memory of a host device that receives content broadcast by a content provider and executed by a processor of the host device to perform acts comprising:
  receiving a communication including an identifier, the communication being received from a point-of-deployment module, wherein the identifier corresponds to the content provider;
  obtaining an image from a plurality of images using the identifier, wherein:
    at least two images of the plurality of images identify respectively different content providers; and
    the obtaining an image from a plurality of images using the identifier further comprises selecting the obtained image based on at least one consideration selected from the group consisting of:
      the time of day at which the obtained image is selected; and the number of times that the obtained image was previously selected; and outputting the obtained image.

42. An identifier routine as described in claim 41, wherein one of more said images of the plurality of images incorporate a selection from the group consisting of:

a branding;
a logo; and
a name.

* * * * *

UNITED STATES PATENT AND TRADEMARK OFFICE
CERTIFICATE OF CORRECTION

| | | |
|---|---|---|
| PATENT NO. | : 8,095,470 B1 | Page 1 of 1 |
| APPLICATION NO. | : 10/457679 | |
| DATED | : January 10, 2012 | |
| INVENTOR(S) | : Joseph J. Seidel | |

It is certified that error appears in the above-identified patent and that said Letters Patent is hereby corrected as shown below:

In column 14, line 38, in Claim 1, after "to" insert -- obtain --, therefor.

Signed and Sealed this
Twenty-eighth Day of February, 2012

David J. Kappos
*Director of the United States Patent and Trademark Office*